Patented Mar. 7, 1933

1,900,351

UNITED STATES PATENT OFFICE

LEOPOLD LASKA AND ARTHUR ZITSCHER, OF OFFENBACH-ON-THE-MAIN, GERMANY, ASSIGNORS TO GENERAL ANILINE WORKS, INC., OF NEW YORK, N. Y., A CORPORATION OF DELAWARE

NEW AZODYESTUFFS

No Drawing. Application filed October 29, 1930, Serial No. 492,080, and in Germany November 5, 1929.

Our U. S. application Serial No. 472,483, filed August 1, 1930, relates to new azodyestuffs which are obtained by combining any diazotized aromatic monoamino-, diamino- or aminoazo-compound (which are thereinafter referred to for the sake of brevity as "aromatic amino compound") with a 3-hydroxy-diphenyl-amine-4-carboxylic acid-arylamide or with a nuclear substitution product thereof.

Our present invention represents a special embodiment of the said invention and consists in using in the above process arylamides which contain in the aryl nucleus a hydroxy group and have, relative to this group, at least one free ortho or para position capable of coupling with diazocompounds. These hydroxylated arylamides correspond to the general formula:

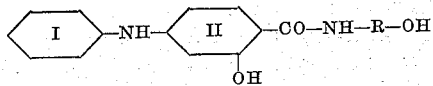

wherein the benzene nucleus signified by I may be substituted and R means a radical of the benzene or naphthalene series having at least one free ortho or para position capable of coupling.

The combining components used in this process may be produced (in the manner described in U. S. Patent No. 1,868,612) by condensing 3-hydroxy-diphenylamine-4-carboxylic acid or a nuclear derivative thereof with a hydroxylated arylamine of the benzene or naphthalene series of the aforesaid kind. Such hydroxylated arylamines of the benzene series are, for instance, 2- or 3- or 4-amino-1-hydroxy-benzene,
1-hydroxy-2-amino-4-methyl-benzene,
1-hydroxy-3-amino-4-methyl-benzene,
1-hydroxy-4-amino-2-methyl-benzene,
1-hydroxy-4-amino-3-methyl-benzene;
of the naphthalene series, 3-amino-2-hydroxy-naphthalene may be mentioned.

The new dyestuffs thus obtained correspond to the general formula:

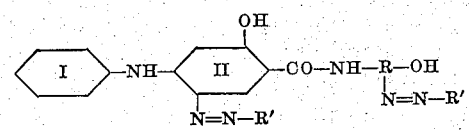

wherein the benzene nucleus I may be substituted, R means an aromatic radical of the benzene or naphthalene series and the radicals R' mean aromatic nuclei which may contain substituents and further azo groups.

They yield on the animal and vegetable fiber mainly brown dyeings of a great value. They are of a special importance for the batic industry, likewise as the dyestuffs described in our above mentioned U. S. application Serial No. 472,483, filed August 1, 1930.

In order to further illustrate our invention, the following examples are given, the parts being by weight and all temperatures in centigrade degrees. We wish it, however, to be understood that we are not limited to the particular products or reaction conditions mentioned therein.

Example 20 grs of the 3-hydroxy-phenyl-amide of 4'-chloro-3-hydroxy-diphenyl-amine-4-carboxylic acid are made to a paste with 20 cc of Turkey red oil of 50% strength and 30 cc of a caustic soda solution of 34° Bé. The paste is moderately warmed and dissolved in about 300 cc of hot soft water, advantageously by boiling. By the addition of cold soft water the whole is made up to 1000 cc and then mixed with 20 grs of common salt. In this solution cotton yarn is impregnated at 30° for 30 minutes.

The padded material is dehydrated and then developed while well handling with a diazo solution prepared as follows:

1.8 grs of the hydro-chloride of 5-chloro-2-amino-toluene are dissolved in 2 cc of hydrochloric acid of 20° Bé. and water, and diazotized with 0.75 grs of sodium nitrite. Then 0.9 grs of sodium bicarbonate and 25 grs of common salt are added and the whole is made up to 1000 cc.

The developed goods are rinsed cold and hot, soaped at the boil for half an hour, rinsed hot and cold and dried.

In this manner bright yellowish brown shades are obtained.

With other diazo compounds and other hydroxy-arylamides of 3-hydroxy-phenylarylamine-4-carboxylic acids, the process may likewise be carried out. The shades of such dyestuffs are shown in the following table:

3'-hydroxy-4''-methyl-diphenylamine-4'-carboxy-3-aminophenol combined with the diazocompound of:

2.5-dichloraniline_____Yellowish brown
3-nitro-4-amino-toluene__Brown
5-nitro-2-amino-toluene__Dark reddish brown 3'-hydroxy-4''-methyl-diphenylamine-4'-carboxy-4-aminophenol combined with the diazocompound of:

1-aminoanthraquinone_____Reddish brown
4-amino-3.2'-dimethyl-azo-benezene_____Reddish brown 3'-hydroxy-2''-methyl-diphenylamine-4'-carboxy-4-aminophenol combined with the diazocmopound of:

2.5-dichloraniline_____Yellowish brown
4-amino-3.2'-dimethyl-azo-benzene_____Reddish brown 3'-hydroxy-4''-methoxy-diphenylamine-4'-carboxy-3-aminophenol combined with the diazocompound of:

2.5-dichloraniline_____Yellowish brown
5-chlor-2-amino-toluene____Yellowish brown
Dianisidine_____Blackish brown 3'-hydroxy-2''-methoxy-diphenylamine-4'-carboxy-3-aminophenol combined with the diazocompound of:

2.5-dichloraniline_____Reddish brown
5-nitro-2-amino-toluene__Dark brown
4-amino-3.2'-dimethyl-azobenzene_____Dark reddish brown
1-aminoanthraquinone__Reddish brown 3'-hydroxy-2''-methoxy-diphenylamine-4'-carboxy-4-aminophenol combined with the diazocompound of:

5-chlor-2-amino-toluene_Yellowish brown
3-nitro-4-amino-toluene_Reddish brown
5-nitro-2-amino-toluene_Reddish brown
Dianisidine_____Deep reddish brown 3'-hydroxy-4''-chloro-diphenylamine-4'-carboxy-3-aminophenol combined with the diazocompound of:

2.5-dichloraniline____ Full yellowish brown
2-nitroaniline_____ Full brown
4-nitro-2-amino-anisole_____ Full brown
3-nitro-4-amino-anisole_____ Full reddish brown
4-amino-3.2'-dimethyl-azo-benzene_____ Full reddish brown
1-aminoanthraquinone_____ Dark reddish brown 3'-hydroxy-4''-chloro-diphenylamine-4'-carboxy-4-aminophenol combined with the diazocompound of:

2.5-dichloraniline_____ Yellowish brown
5-nitro-2-amino-toluene___ Reddish brown
4-amino-3.2'-dimethyl-azobenzene_____ Reddish brown
2-nitroaniline_____ Brown 3'-hydroxy-4''-chloro-diphenylamine-4'-carboxy-6-amino-3-oxy-1-toluene combined with the diazocompound of:

2.5-dichloraniline_____ Yellowish brown
3-nitro-4-amino-toluene___ Brown
4-nitro-2-amino-anisole___ Yellowish brown
1-aminoanthraquinone___ Reddish brown 3'-hydroxy-4''-chloro-diphenylamine-4'-carboxy-2-amino-4-hydroxy-1-toluene combined with the diazocompound of:

3-chloraniline_____ Yellowish brown
2.4.5-trichloraniline_____ Brown
4-chloro-2-amino-toluene_ Yellowish brown
2.5-dichloro-4-amino-toluene_____ Brown
4-chloro-2-amino-diphenyl-ether_____ Brown
4-chloro-2-nitroaniline___ Reddish brown 3'-hydroxy-4''-chloro-diphenylamine-4'-carboxy-3-amino-4-hydroxy-1-toluene combined with the diazocompound of:

2.5-dichloraniline_____ Brown
4-chloro-2-amino-diphenyl-ether_____ Brown
4-chloro-2-nitroaniline____ Brown
1-aminoanthraquinone____ Reddish brown 3'-hydroxy-2''-chloro-diphenylamine-4'-carboxy-3-aminophenol combined with the diazocompound of:

5-chloro-2-amino-toluene_ Yellowish brown
3-nitro-4-amino-toluene___ Reddish brown
4-amino-3.2'-dimethyl-azobenzene_____ Reddish brown 3'-hydroxy-2''-chloro-diphenylamine-4'-carboxy-4-aminophenol combined with the diazocompound of:

5-chloro-2-amino-toluene_ Yellowish brown
3-nitro-4-amino-toluene___ Brown
5-nitro-2-amino-anisole___ Reddish brown
4-nitro-2-amino-anisole___ Yellowish brown 3'-hydroxy-2''-chloro-diphenylamine-4'-carboxy-2-amino-3-naphthol combined with the diazocompound of:

2.5-dicholor-aniline_____ Yellowish brown
5-nitro-2-amino-toluene___ Reddish brown
1-amino-anthraquinone___ Reddish brown Since an object of the present invention is to provide dyestuffs of a good fastness which are insoluble in water and alkalies, it is to be understood that the aromatic nuclei of the general formulæ appearing in the appended claims contain no substituents as are known to render organic compounds soluble in water or alkalies and to tend to depreciate the fastness of the dyestuffs to alkalies. Substituents of this kind are the sulfonic acid and the carboxylic acid group.

We claim:

1. As new compounds the azo-dyestuffs of the probable general formula:

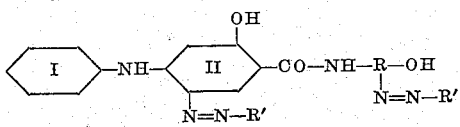

wherein the benzene nucleus I may be substituted by alkyl, alkoxy or halogen, R means an aromatic radical of the benzene or naphthalene series and R' means a radical of the benzene, naphthalene or anthracene series which may contain an alkyl, alkoxy, phenoxy, phenylazo or nitro-group or halogen, which compounds yield when produced on a substratum brown to black shades.

2. As new compounds the azo-dyestuffs of the probable general formula:

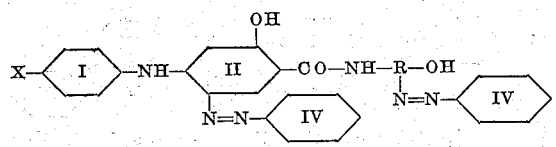

wherein the nucleus I may be substituted by alkyl, alkoxy, phenoxy or halogen, the nuclei IV may be substituted by alkyl, alkoxy, phenoxy, phenylazo, nitro groups or halogen and R means an aromatic radical of the benzene or naphthalene series, which compounds yield when produced on a substratum brown shades.

3. As new compounds the azo-dyestuffs of the probable general formula:

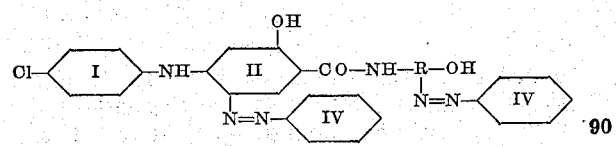

wherein X means alkyl, alkoxy or halogen, the nuclei IV may be substituted by alkyl, alkoxy, phenoxy, phenylazo, nitro groups or halogen and R means an aromatic radical of the benzene or naphthalene series, which compounds yield when produced on a substratum brown shades.

4. As new compounds the azo-dyestuffs of the probable general formula:

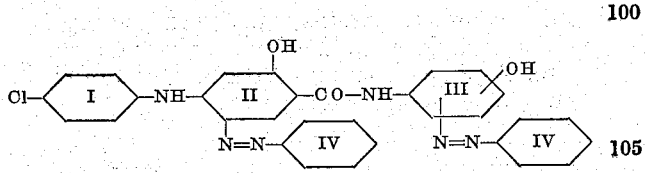

wherein the nuclei IV may be substituted by alkyl, alkoxy, phenoxy, phenylazo, nitro groups or halogen and R means an aromatic radical of the benzene or naphthalene series, which compounds yield when produced on a substratum brown shades.

5. As new compounds the azo-dyestuffs of the probable general formula:

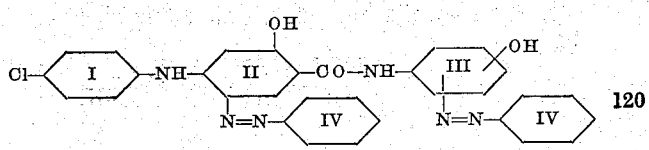

wherein the nuclei IV may be substituted by alkyl, alkoxy, phenoxy, phenylazo, nitro groups or halogen and the nucleus III may be substituted by an alkyl group, which compounds yield when produced on a substratum brown shades.

6. As new compounds the azo-dyestuffs of the probable general formula:

wherein the nuclei IV may be substituted by alkyl, alkoxy, phenoxy, phenylazo, nitro groups or halogen and the nucleus III may be substituted by an alkyl group and its azo-group occupies the para-position relative to the hydroxy-group, which compounds yield when produced on a substratum brown shades.

7. As new compounds the azo-dyestuffs of the probable general formula:

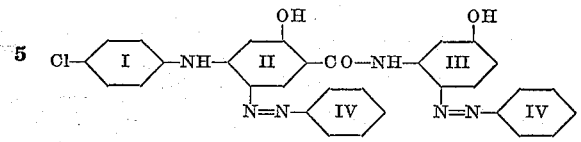

(wherein the nuclei IV may be substituted by alkyl, alkoxy, phenoxy, nitro groups or halogen, which compounds yield when produced on a substratum brown shades.

8. As a new compound the azo-dyestuff of the probable formula:

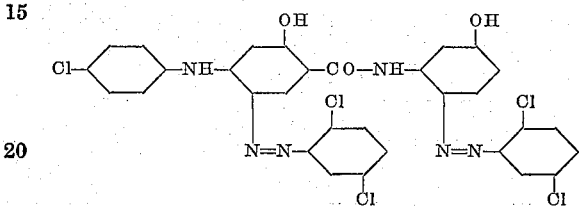

which compound yields when produced on a substratum full yellowish brown shades.

9. As a new compound the azo-dyestuff of the probable formula:

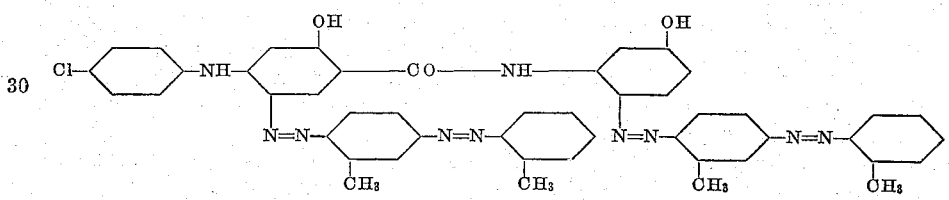

which compound yields when produced on a substratum full reddish brown shades.

10. As a new compound the azodyestuff of the probable formula:

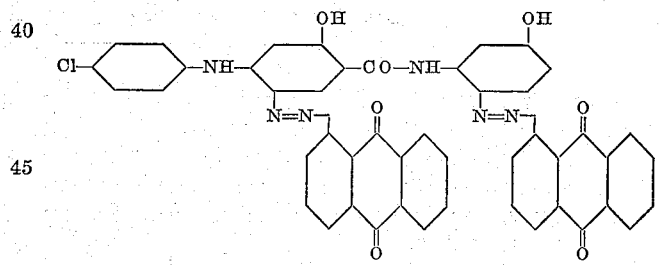

which compound yields when produced on a substratum dark reddish broken shades.

In testimony whereof, we affix our signatures.

LEOPOLD LASKA.
ARTHUR ZITSCHER.